United States Patent
Kobayashi

(10) Patent No.: US 7,406,009 B2
(45) Date of Patent: Jul. 29, 2008

(54) INFORMATION RECORDING/REPRODUCING APPARATUS AND INFORMATION REPRODUCING METHOD

(75) Inventor: Hideki Kobayashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 511 days.

(21) Appl. No.: 10/701,080

(22) Filed: Nov. 5, 2003

(65) Prior Publication Data

US 2004/0125718 A1    Jul. 1, 2004

(30) Foreign Application Priority Data

Nov. 8, 2002    (JP) ............................. 2002-325832

(51) Int. Cl.
*G11B 7/00* (2006.01)
(52) U.S. Cl. ................................. 369/47.31; 369/59.23
(58) Field of Classification Search .............. 369/47.31, 369/47.19, 59.23
See application file for complete search history.

(56) References Cited

U.S. PATENT DOCUMENTS 6,172,952 B1 *   1/2001   Inokuchi et al. .......... 369/47.55
6,459,667 B1 *  10/2002   Iijima et al. .............. 369/47.31
6,522,831 B2 *   2/2003   Tanaka et al. .............. 386/116
6,577,569 B1 *   6/2003   Yamamoto et al. ....... 369/47.18

* cited by examiner

*Primary Examiner*—Gautam R Patel
(74) *Attorney, Agent, or Firm*—Drinker Biddle & Reath LLP

(57) ABSTRACT

An information recording/reproducing apparatus and information reproducing method records information data, regardless of an external disturbance. According to a demodulated timing pulse, a synchronization signal and address data representative of an address is demodulated from a readout signal. An error correction process carried out on the address data obtains corrected address data. A determination is made if the corrected address data is a correct address. When the synchronization signal has a period equal to a predetermined period, a synchronization process is executed to place the demodulated timing pulse in synchronism with the synchronization signal, wherein, when the corrected address data is determined as a correct address, then the re-synchronization process is put into stand-by until the corrected address data is determined as an incorrect address. When the synchronization signal is temporarily influenced by an external disturbance, information data recording is completed without a re-synchronization process and interrupting recording operation.

11 Claims, 14 Drawing Sheets

INFORMATION RECORDING/REPRODUCING APPARATUS AND INFORMATION REPRODUCING METHOD

BACKGROUND OF THE INVENTION

1. Technical Field

The present invention relates to an information recording/reproducing apparatus and information reproducing method.

2. Description of the Relate Art

In recent years, recording disks capable of writing information data, including CD-RWs and DVD-RWs, are widespread along with disk recorders to write information data to those of recording disks. On such a recording disk, disk addresses to represent an on-disk positions as well as a synchronization signal have been previously recorded. Upon starting the recording, the disk recorder detects a synchronization signal from among the signals read from the recording disk. Based upon the detected synchronization signal, a timing signal is generated to demodulate the on-disk address. Accordingly, in case the readout signal is temporarily disturbed under influence of an external disturbance, e.g. crosstalk from the adjacent track, or the dust, mar or fingerprint on the disk surface, phase synchronization state of the timing signal with respect to the synchronization signal is possibly canceled. In such a case, when the synchronization signal restores its normal state, a re-synchronism process is required to implement in order to take phase synchronism with the synchronization signal again. There is a problem that, in this duration, the disk recorder is not allowed to discontinue the recording operation or start a recording operation.

It is an object of the present invention to provide an information recording/reproducing apparatus and information reproducing method which can swiftly complete to record information data even under influence of an external disturbance or the like.

SUMMARY OF THE INVENTION

An information recording/reproducing apparatus according to a first aspect of the present invention is an information recording/reproducing apparatus for recording or reproducing information data to or from a recording medium recorded with a synchronization signal and an address indicating a recording position which are preliminarily modulated, comprising: a reading component for reading recorded information from the recording medium and obtaining a readout signal; a timing pulse generator for generating a demodulated timing pulse in variable generation timing; a demodulator for demodulating the synchronization signal and the address data representative of an address from the readout signal according to the demodulated timing pulse; an error corrector for carrying out an error correction process on the address data and obtaining corrected address data; an address judging section for determining whether or not the corrected address data is a correct address; and a synchronization controller for causing the timing pulse generator to execute a synchronization process for placing the generation timing in synchronism with the synchronization signal when the synchronization signal has a period equal to a predetermined period; whereby the synchronization controller, in the case the corrected address data is determined as a correct address, then puts the synchronization process into stand-by for execution until the corrected address data is determined as an incorrect address.

An information recording/reproducing apparatus according to another aspect of the invention is an information recording/reproducing apparatus for recording or reproducing information data to or from a recording medium recorded with a synchronization signal and an address indicating a recording position which are preliminarily modulated, comprising: a reading unit for reading recorded information from the recording medium and obtaining a readout signal; a timing pulse generator for generating a demodulated timing pulse in variable generation timing; a demodulator for demodulating the synchronization signal from the readout signal according to the demodulated timing pulse; a synchronization controller for causing the timing pulse generator to execute a synchronization process for placing the generation timing in synchronism with the synchronization signal when the synchronization signal has a period equal to a predetermined period; whereby the synchronization controller puts the synchronization process into stand-by for execution during recording operation to record the information data to the recording medium.

Meanwhile, an information reproducing apparatus according to another aspect of the invention is an information reproducing apparatus for reproducing information data from a recording medium recorded with a synchronization signal and an address indicating a recording position which are preliminarily modulated, comprising: a reading unit for reading recorded information from the recording medium and obtaining a readout signal; a timing pulse generator for generating a demodulated timing pulse in variable generation timing; a demodulator for demodulating the synchronization signal and the address from the readout signal according to the demodulated timing pulse; an error corrector for carrying out an error correction process on the address data and obtaining corrected address data; an address judging section for determining whether or not the corrected address data is a correct address; and a synchronization controller for causing the timing pulse generator to execute a synchronization process for placing the generation timing in synchronism with the synchronization signal when the synchronization signal has a period equal to a predetermined period; whereby the synchronization controller, in the case the corrected address data is determined as a correct address, then puts the synchronization process into stand-by for execution until the corrected address data is determined as an incorrect address.

An information reproducing method according to another aspect of the invention is an information reproducing method for reproducing, from a recording medium recorded with a synchronization signal and an address indicating a recording position which are preliminarily modulated, the synchronization signal and address from the recording medium when recording or reproducing information data to or from the recording medium, comprising: a reading step for reading recorded information from the recording medium and obtaining a readout signal; a timing pulse generating step for generating a demodulated timing pulse in variable generation timing; a demodulating step for demodulating the synchronization signal and the address data representative of the address, from the readout signal according to the demodulated timing pulse; an error correcting step for carrying out an error correction process on the address data and obtaining corrected address data; an address determining step for determining whether or not the corrected address data is a correct address; and a synchronization control step for causing the timing pulse generator to execute a synchronization process for placing the generation timing in synchronism with the synchronization signal when the synchronization signal has a period equal to a predetermined period; whereby the synchronization control step, in the case the corrected address data is determined as a correct address, then puts the synchronization process into stand-by for execution until the corrected address data is determined as an incorrect address.

An information reproducing method according to another aspect of the invention is an information reproducing method for reproducing, from a recording medium recorded with a synchronization signal and an address indicating a recording position which are preliminarily modulated, the Osynchronization signal and address from the recording medium when recording or reproducing information data, comprising: a reading step for reading recorded information from the recording medium and obtaining a readout signal; a timing pulse generating step for generating a demodulated timing pulse in variable generation timing; a demodulating step for demodulating the synchronization signal from the readout signal according to the demodulated timing pulse; a synchronization control step for causing to execute a synchronization process for placing the generation timing in synchronism with the synchronization signal when the synchronization signal has a period equal to a predetermined period; whereby the synchronization control step puts the synchronization process into stand-by for execution during recording operation to record the information data to the recording medium.

DETAILED DESCRIPTION OF THE INVENTION

Embodiments of the present invention will be described in detail with reference to the drawings.

Figure 1:
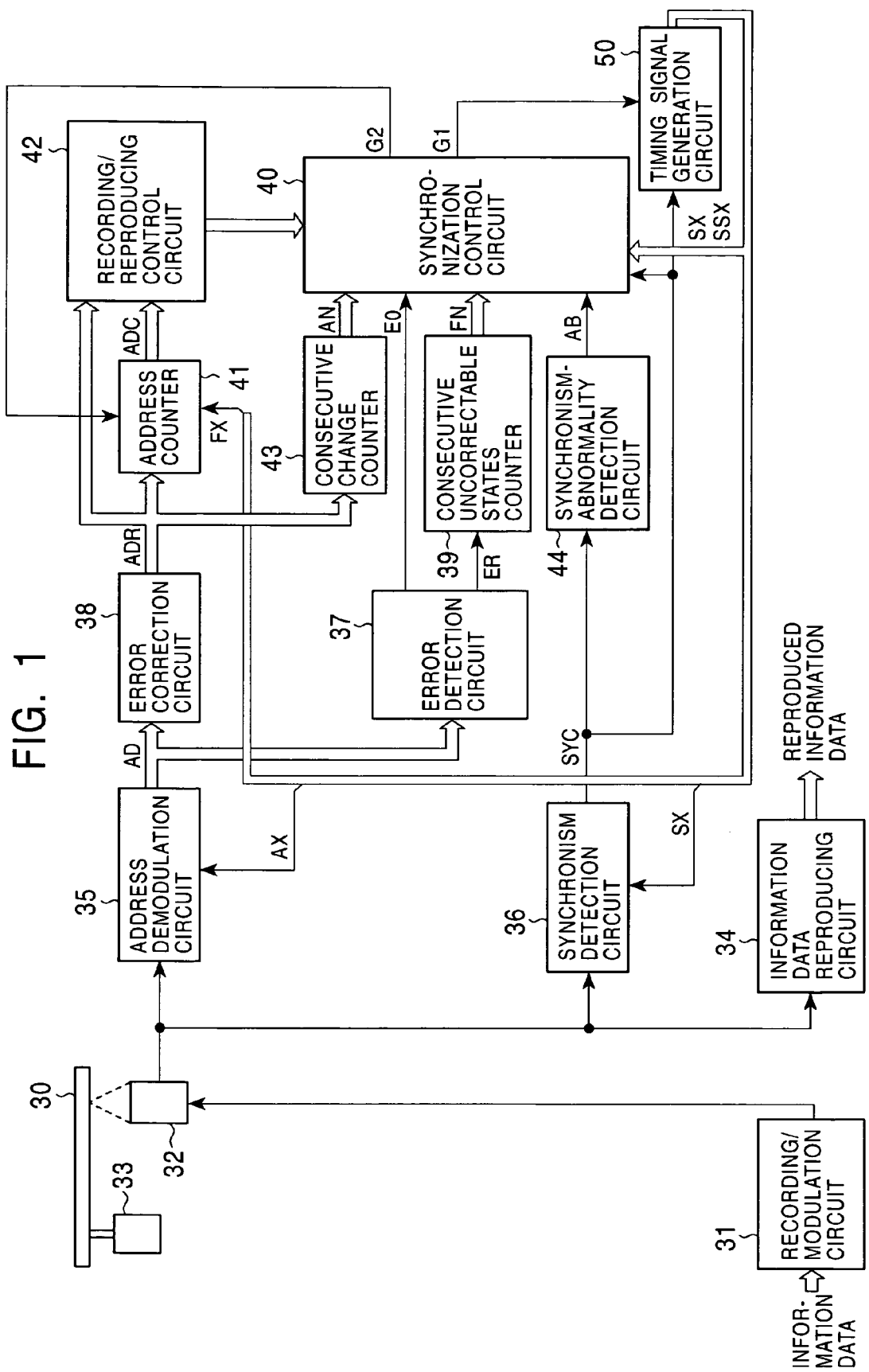
FIG. 1 is a diagram showing a configuration of an information recording/reproducing apparatus according to the present invention.

FIG. 1 is a diagram showing a configuration of an information recording/reproducing apparatus for recording or reproducing information data to or from a recording disk 30.

In FIG. 1, a recording/modulation circuit 31 supplies the recording/reproducing head 32 with a modulated record signal obtained by modulating the information data to be recorded to the recording disk 30 according to a predetermined record-modulation scheme. The recording disk 30 is previously recorded with a disk address representative of a position on the disk and a synchronization signal serving to take synchronization timing during control of recording/reproducing. Incidentally, the disk address and the synchronization signal are modulated based on the record modulation scheme. The recording/reproducing head 32 irradiates a recording or reading beam of light onto a surface of the recording disk 30 rotated by the spindle motor 33. Namely, upon recording information data to the recording disk 30, the recording/reproducing head 32 irradiates a recording light beam according to the modulated record signal onto the surface of the recording disk 30. Meanwhile, when reproducing information data from the recording disk 30, the recording/reproducing head 32 irradiates a reading light beam onto the surface of the recording disk 30. In this process, the recording/reproducing head 32 performs a photoelectric conversion on the reflection light of from the surface of the recording disk 30, to generate a readout signal. This signal is supplied to the respective ones of an information-data reproducing circuit 34, an address demodulating circuit 35 and a synchronism detecting circuit 36. The information-data reproducing circuit 34 carries out a predetermined demodulating process on the readout signal, thereby restoring the information data recorded on the recording disk 30 and outputting it as reproduced information data.

The address demodulating circuit 35 carries out a demodulating process on the readout signal according to an address demodulated timing signal AX supplied from a timing-signal generation circuit 50 (referred later). Due to the demodulating process, the address demodulating circuit 35 demodulates an on-disk address and supplies the address data AD-representative of that on-disk address to an error detecting circuit 37 and error correcting circuit 38.

The error detecting circuit 37 carries out an error detecting process on the address data AD. Due to the error detecting process, the error detecting circuit 37 generates, for each 1-code block of address data AD, an error zero signal E0 in logic level 0 when an error exists in the address data AD and in logic level 1 when it does not exist therein, to supply it to a synchronization control circuit 40. Furthermore, the error detecting circuit 37 generates, for each 1-code block of address data AD, an uncorrectable signal ER in logic level 0 when the address data AD can be error-corrected and in logic level 1 when it cannot be error-corrected, to supply it to a consecutive uncorrectable states counter 39.

The consecutive uncorrectable states counter 39 counts the number of times that the uncorrectable signal ER consecutively assumes a logic level 1, and supplies a consecutive uncorrectable states signal FN representative of that number of times to the synchronization control circuit 40. Namely, the consecutive uncorrectable states counter 39 supplies the synchronization control circuit 40 with a consecutive uncorrectable states signal FN representative of the number of times that the address data AD is consecutively uncorrectable in each code block. Incidentally, the consecutive uncorrectable states counter 39 resets its count value whenever the uncorrectable signal ER takes a logic level 0.

The error correcting circuit 38 carries out an error correction process on the address data AD. The address data error-corrected by this error correction process is supplied as corrected address data ADR to the respective ones of an address counter 41, a recording/reproducing control circuit 42 and a continuous change number counter 43.

Figure 2:
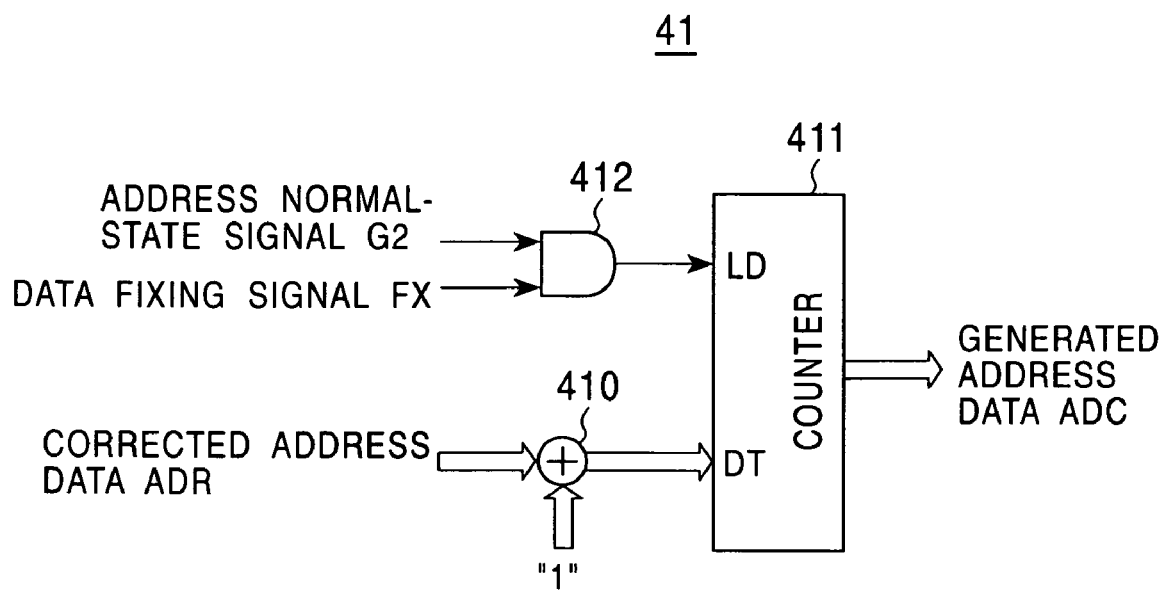
FIG. 2 is a diagram showing an internal configuration of an address counter 41 of the information recording/reproducing apparatus shown in FIG. 1.

FIG. 2 is a diagram showing an internal configuration of the address counter 41.

In FIG. 2, an adder 410 supplies a value the corrected address data ADR is added by "1" to a load-data terminal DT of a counter 411. An AND gate 412 supplies a data load signal in logic level 1 to a data load control terminal LD only when an address normal-state signal G2 in logic level 1 is supplied from the synchronization control circuit 40 and a data fixing signal FX in logic level 1 is supplied from the timing-signal generation circuit 50. The counter 411 makes a count-up operation to count up by one each time a predetermined time period is elapsed, to output a current count value as generated address data ADC. Incidentally, the counter 411, when supplied by a data-load signal in logic level 1, takes in as a count initial value a value the corrected address data ADR is added by 1, to make a count-up operation as in the above continuing from that count initial value. Incidentally, the counter 411, when its count value reaches a predetermined maximum value, resets the count value to 0, thereby continuing the count-up operation as in the above.

With this configuration, the address counter 41 supplies, as generated address data ADC, a current count value obtained in the count up operation to the recording/reproducing control circuit 42. In this process, in the case that a data fixing signal FX in logic level 1 has been supplied during supplying an address normal-state signal G2 in logic level 1, a value the address data ADR is added by 1 is taken in as a count initial value, to make a count-up operation continuing from that count initial value.

A consecutive changes counter 43 counts the number of times the corrected address data ADR increases or decreases by 1 at one time, to supply a continuous address change number signal AN representative of that number of times to the synchronization control circuit 40. Incidentally, the consecutive changes counter 43 resets its count value to 0 when the corrected address data ADR increases (or decreases) two or more after a lapse of a predetermined period of time, i.e. when the corrected address data ADR is discontinued in its one-by-one continuous increase (or decrease).

The recording/reproducing control circuit 42 controls the recording/reproducing head 32, the spindle motor 33 and the slider mechanism (not shown) for moving the recording/reproducing head 32 radially of the disk, in order to carry out various recording and reproducing operations on the information recording/reproducing apparatus according to various operations by the user. Incidentally, during recording, the recording/reproducing control circuit 42 searches for a on-disk position on the basis of the generated address data ADC or corrected address data ADR, in order to initiate recording at a desired disk position on the recording disk 30.

The synchronism detecting circuit 36 carries out a demodulating process on the readout signal according to a synchronization demodulation timing signal SX supplied from the timing-signal generation circuit 50 (referred later), thereby demodulating a synchronization signal. The synchronization detection circuit 36 supplies a synchronization detection signal SYC containing a synchronization pulse to shift from logic level 0 to logic level 1 in the detection timing of the synchronization signal demodulated by the demodulating process, to the synchronization control circuit 40, synchronism-abnormality detecting circuit 44 and timing-signal generation circuit 50.

The synchronism-abnormality detecting circuit 44, when the synchronization pulse on a synchronization detection signal SYC has a predetermined period T, supplies the synchronization control circuit 40 with an synchronism-abnormality detection signal AB in the logic level 0 representative of "synchronism abnormality absent". Meanwhile, when the synchronization pulse on a synchronization detection signal SYC has a period not the predetermined period T, the synchronism-abnormality detecting circuit 44 supplies the synchronization control circuit 40 with an synchronism-abnormality detection signal AB in the logic level 1 representative of "synchronism abnormality present". Namely, the synchronism abnormality detecting circuit 44 supplies the synchronization control circuit 40 with an synchronism-abnormality detection signal AB in the logic level 0 when a synchronization signal can be correctly read from the recording disk 30 and in the logic level 1 when a synchronization signal cannot be correctly read from the recording disk 30.

The timing-signal generation circuit 50 generates an address demodulated timing signal AX, synchronization demodulation timing signal SX and temporary synchronization read timing signal SSX as noted before, on the basis of a synchronization detection signal SYC and a synchronization command signal G1 supplied from the synchronization control circuit 40. The timing-signal generation circuit 50 supplies an address demodulated timing signal AX and a synchronization demodulation timing signal SX respectively to the address demodulating circuit 35 and the synchronism detecting circuit 36, and a synchronization demodulation timing signal SX and a temporary synchronization read timing signal SSX to the synchronization control circuit 40. Furthermore, the timing-signal generation circuit 50 generates a data fixing signal FX as noted before depending upon the synchronization detection signal SYC and synchronization command signal G1, and supplies it to the address counter 41.

Figure 3:
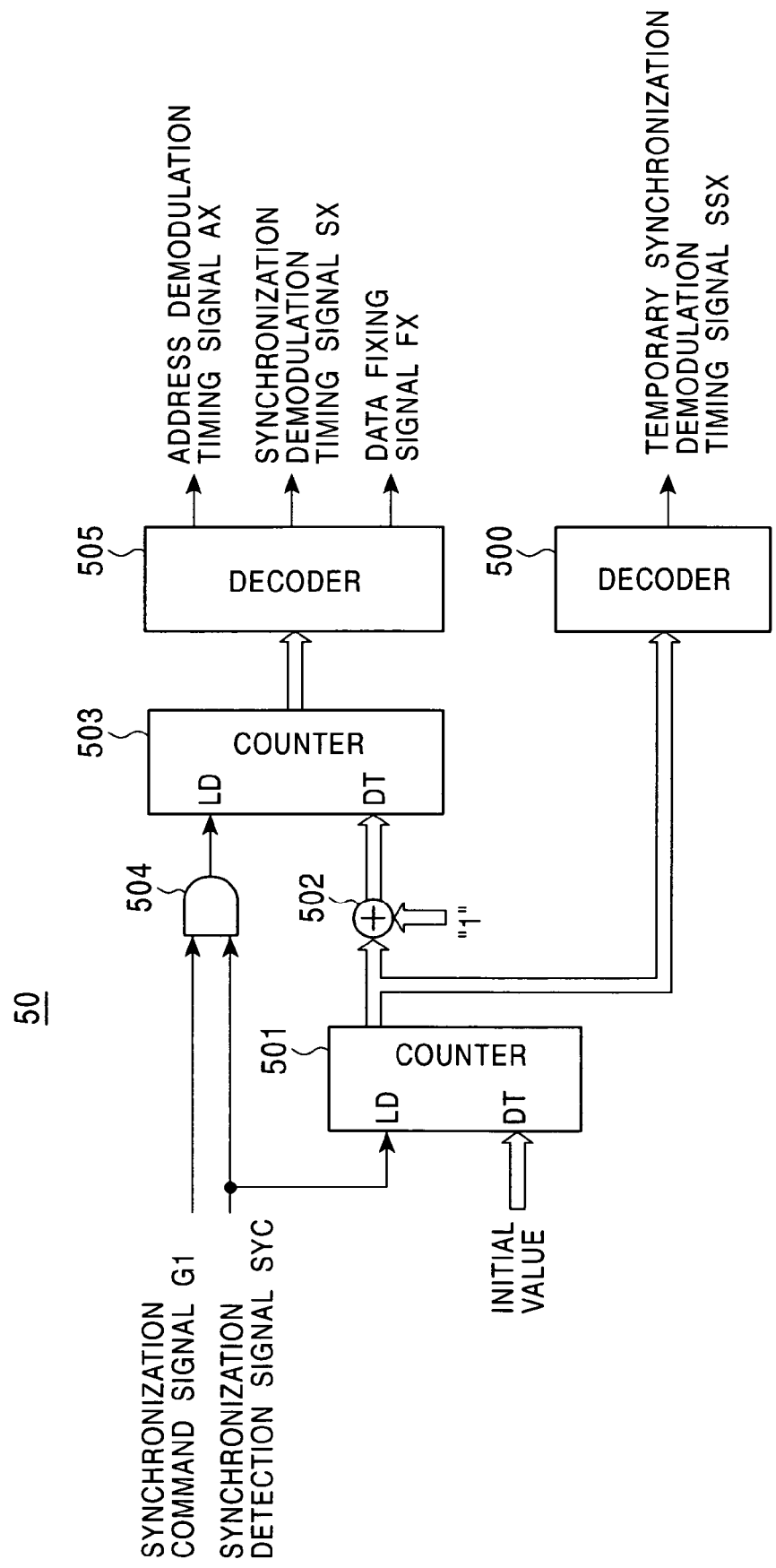
FIG. 3 is a diagram showing an internal configuration of a timing-signal generation circuit 50 of the information recording/reproducing apparatus shown in FIG. 1.

FIG. 3 is a diagram showing an example on an internal configuration of the timing-signal generation circuit 50.

In FIG. 3, a counter 501 takes in an initial value whenever a synchronization detection signal SYC in logic level 1 is supplied from the synchronism detecting circuit 36. This initial value is counted up each time a predetermined period of time elapses, whereby a count value is obtained and supplied to a decoder 500 and adder 502. Incidentally, the counter 501, when its count value reaches a predetermined maximum value, resets the count value to 0, thus continuously carrying out the count-up operation. The decoder 500 generates a pulse signal which is to shift from logic level 0 to logic level 1 when the count value of the counter 501 coincides with a predetermined count value, and outputs it as a temporary synchronization read timing signal SSX. An adder 502 supplies a value of the counter value of the counter 501 added by "1" to a load-data terminal DT of a counter 503. An AND gate 504 supplies a data load signal in logic level 1 to the data load control terminal LD of the counter 503 only when a synchronization command signal G1 in logic level 1 is supplied from the synchronization control circuit 40 and the synchronization detection signal SYC is in logic level 1. The counter 503 makes a count-up operation to count up by one each time a predetermined period of time is elapsed, and supplies a current count value to the decoder 505. Incidentally, the counter 503, when supplied by a data-load signal in logic level 1, takes in as a count initial value a value the count value of the counter 501 is added by 1, to make a count-up operation continuing from the count initial value. Meanwhile, the counter 503, when its count value reaches a predetermined maximum value, resets the count value to 0, to continue the count-up operation. When the count value of the counter 503 coincides with a predetermined first count value, a decoder 505 generates a pulse signal that is to shift from logic level 0 to logic level 1 and outputs it as an address demodulated timing signal AX. Meanwhile, when the count value of the counter 503 coincides with a predetermined second count value, the decoder 505 generates a pulse signal that is to shift from logic level 0 to logic level 1 and outputs it as a synchronization demodulation timing signal SX. Meanwhile, when the count value of the counter 503 coincides with a predetermined third count value, the decoder 505 generates a data fixing signal FX in logic level 1 representing that the process on 1-code block is completed in the error detecting circuit 37 and error correcting circuit 38.

Figure 4:
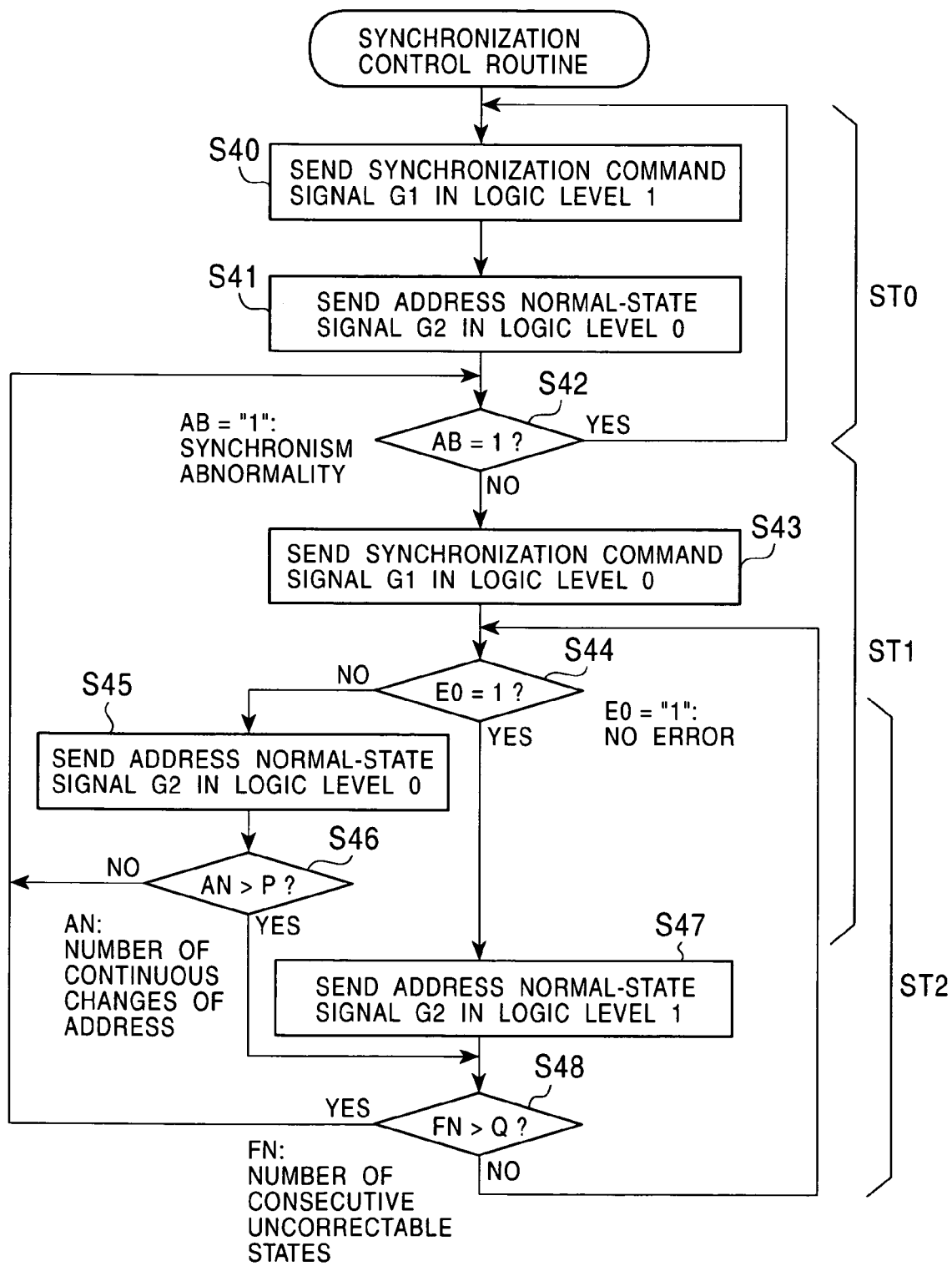
FIG. 4 is a diagram showing one example of a synchronization control routine to be executed in the synchronization control circuit 40.

The synchronization control circuit 40 identifies a state of the disk address and synchronization signal reproduced from the recording disk 30 by a procedure according to a synchronization control routine as shown in FIG. 4. Depending upon an identification result, it controls the address counter 41 and timing-signal generation circuit 50.

In FIG. 4, first, the synchronization control circuit 40 supplies a synchronization command signal G1 in logic level 1 to the timing generation circuit 50 (step S40). By executing the step S40, the counter 503 of the timing generation circuit 50 takes in a predetermined counter initial value each time a synchronization detection signal SYC in logic level 1 is supplied, thus making a count-up operation. Due to this, from the decoder 505 is outputted a data fixing signal FX, address demodulated timing signal AX and synchronization demodulation timing signal SX as noted before in timing synchronization with the synchronization detection signal SYC. After executing the step S40, the synchronization control circuit 40 supplies the address counter 41 with an address normal-state signal G2 in logic level 0 representative of not having acquired a normal address (step S41). By executing the step S41, the counter 411 of the address counter 41 operates by itself. Next, the synchronization control circuit 40 determines whether or not the synchronism-abnormality detection signal AB is in level 1 representative of a synchronism abnormality (step S42). While, in the step S42, the synchronism-abnormality detection signal AB is in logic level 1, i.e. if determined that a synchronization signal could not have been read from the recording disk 30, the synchronization control circuit 40 returns to the step S40 and repetitively executes the foregoing operation.

Meanwhile, in the case, in the step S42, the synchronism-abnormality detection signal AB is not in logic level 1, i.e. in the case it is determined that a synchronization signal could have been correctly read from the recording disk 30, the synchronization control circuit 40 supplies a synchronization command signal G1 in logic level 0 to the timing-signal generation circuit 50 (step S43). By executing the step S43, the counter 503 of the timing generation circuit 50 operates by itself. Next, the synchronization control circuit 40 determines whether or not an error zero signal E0 is in logic level 1 representative of a state free of error (step S44). In the step S44, when it is determined that the error zero signal E0 is not in logic level 1, i.e. an error exist in the address data AD, the synchronization control circuit 40 supplies the address counter 41 with an address normal-state signal G2 in logic level 0 representative of not having acquired a normal address (step S45). By executing the step S45, the counter 411 of the address counter 41 operates by itself. Next, the synchronization control circuit 40 determines whether or not the address continuous changes signal AN represents an address continuous changes greater than a predetermined number P (step S46). If it is determined in step S46 that the address continuous changes signal AN is not greater than the predetermined number P, the synchronization control circuit 40 returns to the step S42 and repetitively executes the foregoing operation.

Meanwhile, If it is determined in the step S44 that the error zero signal E0 is in logic level 1, the synchronization control circuit 40 supplies the address counter 41 with an address normal-state signal G2 in logic level 1 representative of having acquired a normal address (step S47). By executing the step S47, the address counter 41 takes in as a counter initial value a value the corrected address data ADR is added by 1 each time a data fixing signal FX in logic level 1 is supplied from the timing-signal generation circuit 50, and makes a count-up operation continuing from that value. Namely, the address counter 41 creates generated address data ADC on the basis of the normal corrected address data ADR reproduced from the recording disk 30. On the other hand, if it is determined in the step S46 that the address continuous changes signal AN is greater than the predetermined number P, the error zero signal E0 is in logic level 0 and the address continuous changes signal AN is greater than the predetermined number P. Hence, the address counter 41 makes a count-up operation. Next, the synchronization control circuit 40 determines whether or not the consecutive uncorrectable states signal FN represents the number of times greater than a predetermined number of times Q (step S48). In the step S48, if the consecutive uncorrectable states signal FN is determined not greater than the predetermined number of times Q, the synchronization control circuit 40 returns to executing the step S44 and determines whether or not a normal address has been acquired. In this duration, if it is determined in step S48 that the uncorrectable continuous number of times signal FN is greater than a required number of times Q, the synchronization control circuit 40 returns to executing the step S42 and repetitively executes the foregoing operation.

Figure 5:
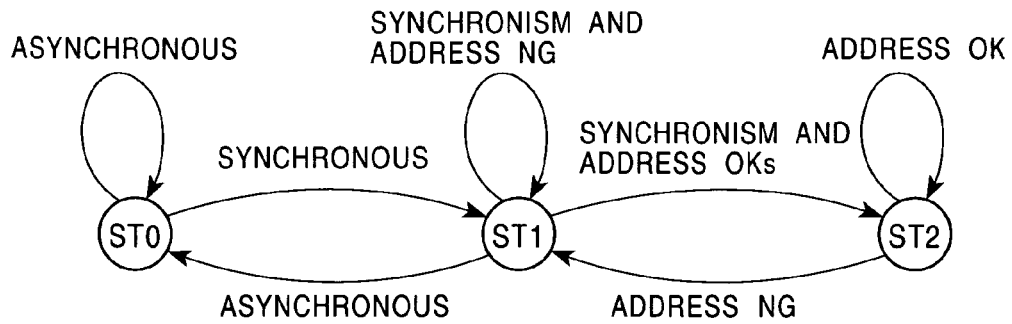
FIG. 5 is a state transition diagram showing the state of the address counter 41 and the state of the timing-signal control circuit 50 when the synchronization control circuit 40 carries out a synchronization control process according to a synchronization control routine shown in FIG. 4.

FIG. 5 is a diagram showing a transition in the setting state to the address counter 41 and timing-signal generation circuit 50 when the synchronization control circuit 40 carries out a synchronization control process according to a synchronization control routine shown in FIG. 4.

At first, while it is determined that a synchronization signal cannot be correctly read from the recording disk 30 (step S42), supplied are a synchronization command signal G1 in logic level 1 and an address normal-state signal G2 in logic level 0, hence maintaining an asynchronous state ST0 as shown in FIG. 5. In the asynchronous state ST0, the counter 503 within the timing-signal generation circuit 50 makes a re-synchronism process. Namely, even in case the reproducing state is unstable, various signals, such as data fixing signal FX, address demodulated timing signal AX and synchronization demodulation timing signal SX, are generated according to the synchronization detection signal at that time. Meanwhile, the address counter operates by itself.

Meanwhile, if it is determined that the synchronization signal could have been correctly read out (step S42), the process returns to a synchronization state ST1 as shown in FIG. 5. In the synchronization state ST1, a synchronization command signal G1 in logic level 0 is supplied to the timing-signal generation circuit 50 (step S43). Due to this, the counter operates by itself and the timing-signal generation circuit 50 begins to generate a data fixing signal FX, address demodulated timing signal AX and synchronization demodulation timing signal SX synchronization in phase with the synchronization detection signal SYC. In this duration, if the corrected address data ADR reproduced from the recording disk 30 has been determined not changed consecutively a number of times greater than a predetermined number P (step S46) and a synchronization signal could not have been correctly read out (step S42), then the process returns to an asynchronous state ST0. Due to this, a synchronization command signal G1 in logic level 1 is sent to execute a re-synchronism process. On the other hand, when determined that there is no error in the corrected address data ADR (step S44), i.e. when the corrected address data ADR is determined as a correct address, the process returns to an address normal state ST2.

In the address normal state ST2, an address normal state signal G2 in logic level 1 is supplied to the address counter 41 (step S47). Due to this, the address counter 41 takes in the corrected address data ADR and increases (or decreases) the address data value thereof by 1 at one time, thereby creating generated address data ADC and supplying it to the recording/reproducing control circuit 42. If the corrected address data ADR is determined having an error (E0="0") and the corrected address data ADR is determined having continuously changed a number of times greater than the predetermined number P, an address normal state signal G2 in logic level 0 is supplied to increase (or decrease) by 1 at one time the value of address data acquired before. In this duration, the address normal state ST2 is maintained unless the address data AD read out from the recording disk 30 and demodulated is determined to be uncorrectable consecutively a number of times greater than a predetermined number of times Q (step S48). Meanwhile, in the case that the address data AD is determined to be uncorrectable consecutively a number of times greater than the predetermined number of times Q, i.e. in the case the corrected address data ADR is determined an incorrect address, the process returns to a synchronization state ST1. Namely, in the case that the corrected address data ADR is determined as not a correct address, it is determined that there is a possibility of going out of synchronism under influence of a certain external disturbance, and the process returns to the synchronization state ST1 where determination is made for a synchronization state. As a result, in the case of a determination of going out of synchronism, a synchronization command signal in logic level 1 is sent to thereby effect a re-synchronism process (loading the counter 503 with an initial value in timing synchronization with the synchronization detection signal SYC).

In other words, once the corrected address data ADR is determined a correct address, even if the synchronization signal read from the recording disk 30 be temporarily disturbed, a re-synchronism process is put into stand-by for execution until the corrected address data ADR is determined an incorrect address.

Accordingly, in the synchronization control process by the synchronization control circuit 40, a re-synchronism process cannot be effected by a temporary disturbance or so of a synchronization signal due to an external disturbance, such as crosstalk from an adjacent track or surface damage of the recording disk. Information data recording can be swiftly completed without discontinuing the recording operation.

Meanwhile, in the above embodiment, synchronization state was shifted from ST1 to ST2 (or from ST1 to ST2) in accordance with an error state of address data AD. Alternatively, transition of synchronization state may be carried out from ST1 to ST2 (or from ST1 to ST2) by starting or ending a record to the recording disk 30.

Figure 6:
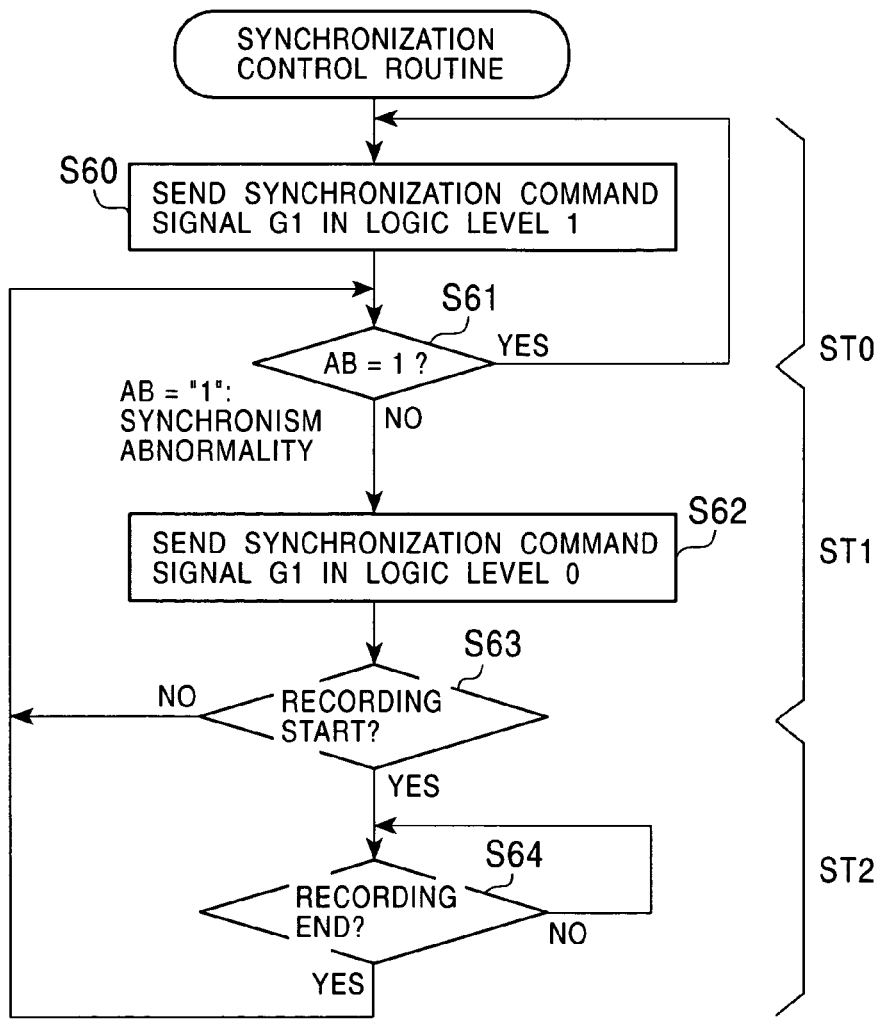
FIG. 6 is a diagram showing another example of a synchronization control routine to be executed in the synchronization control circuit 40.

FIG. 6 is a diagram showing another example of synchronization control routine made in view of that point.

In FIG. 6, the synchronization control circuit 40 first supplies a synchronization command signal G1 in logic level 1 to the timing-signal generation circuit 50 (step S60). By executing the step S60, the counter 503 of the timing-signal generation circuit 50 takes in a predetermined counter initial value each time a synchronization detection signal SYC in logic level 1 is supplied, thus effecting a count-up operation. Due to this, from the decoder 505 is outputted a data fixing signal FX, address demodulated timing signal AX and synchronization demodulation timing signal SX as noted before in timing synchronization with the synchronization detection signal SYC. After executing the step S60, the synchronization control circuit 40 determines whether or not the synchronism-abnormality detection signal AB is in level 1 representative of an abnormality of synchronism (step S61). While, in the step S61, the synchronism-abnormality detection signal AB is in logic level 1, i.e. while determined that a synchronization signal could not have been correctly read from the recording disk 30, the synchronization control circuit 40 returns to the step S60 and repetitively executes the foregoing operation.

Meanwhile, if, in the step S61, the synchronism-abnormality detection signal AB is not in logic level 1, i.e. if determined that a synchronization signal could have been correctly read from the recording disk 30, the synchronization control circuit 40 supplies a synchronization command signal G1 in logic level 0 to the timing-signal generation circuit 50 (step S62). By executing the step S62, the counter 503 of the timing-signal generation circuit 50 operates by itself. After executing the step S62, the synchronization control circuit 40 then determines whether or not to the recording disk 30 has been supplied, from a recording/reproducing control circuit 42, a record start signal notifying that recording information data is to be started (step S63). If it is determined in step S63 that a record starting signal has not been supplied, the synchronization control circuit 40 returns to executing the step S61 and repetitively executes the foregoing operation. Meanwhile, if it is determined in step S63 that a record starting signal has been supplied, the synchronization control circuit 40 then repetitively determines whether or not a record ending signal notifying to end the recording of information data to the recording disk 30 has been supplied from the recording/reproducing control circuit 42 until a record ending signal is supplied (step S64). If it is determined in the step S64 that a record ending signal has been supplied, the synchronization control circuit 40 returns to executing the step S61 and repetitively executes the foregoing operation.

Figure 7:
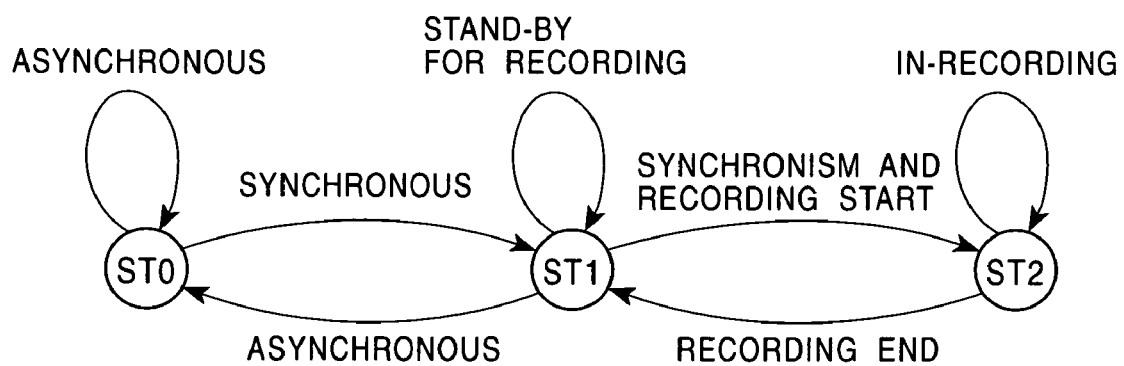
FIG. 7 is a state transition diagram showing the state of the timing-signal generation circuit 50 when the synchronization control circuit 40 carries out a synchronization control process according to a synchronization control routine shown in FIG. 6.

FIG. 7 is a diagram showing a transition in a setting state to the timing-signal generation circuit 50 when the synchronization control circuit 40 makes a synchronization control process according to a procedure shown in FIG. 6.

At first, while a synchronism-abnormality detection signal AB is in logic level 1, i.e. it is determined that a synchronization signal cannot be correctly read from the recording disk 30 (step S61), maintained is an asynchronous state ST0 as shown in FIG. 5. In the asynchronous state ST0, the counter 503 within the timing-signal generation circuit 50 carries out a re-synchronism process according to a synchronization command signal G1 in logic level 1, thereby generating a data fixing signal FX, an address demodulated timing signal AX and a synchronization demodulation timing signal SX.

Meanwhile, if it is determined that a synchronization signal could have been correctly read from the recording disk 30, the process returns to a synchronization state ST1 as shown in FIG. 7. In the synchronization state ST1, a synchronization command signal G1 in logic level 0 is supplied to the timing-signal generation circuit 50 (step S62). Due to this, the timing-signal generation circuit 50 begins to generate a data fixing signal FX, address demodulated timing signal AX and synchronization demodulation timing signal SX that is synchronization in phase with the synchronization detection signal SYC. In this duration, if it is determined that a record starting signal has been supplied (step S63), the process shifts to a recording state ST2 shown in FIG. 7. Meanwhile, if a record starting signal is determined to be not supplied and a synchronization signal is determined not to be correctly read out (step S61), the process shifts to an asynchronous state ST0.

In the recording state ST2, the recording state ST2 is maintained until a record ending signal is supplied (step S64). In this process, if it is determined supplied by a record ending signal, the process shifts to a synchronization state ST1. Namely, the recording state ST2 is maintained during recording to the recording disk 30. In this duration, after recording is over, the process returns to a synchronization state ST1 and carries out a synchronizing process, monitoring the synchronization state. Herein, if a synchronism-abnormality signal is detected, a re-synchronism process (loading an initial value to the counter 503 in timing synchronization with the synchronization detection signal SYC) is carried out. In other words, during a record operation, even if a temporary disturbance be caused in the synchronization signal read from the recording disk 30, the record operation is continued without executing a re-synchronism process.

Accordingly, in the synchronization control process as shown in FIGS. 6 and 7, re-synchronism process cannot be effected even if the synchronization signal is disturbed by external disturbance, such as crosstalk from an adjacent track or surface damage of the recording disk. Accordingly, information data recording can be swiftly completed without discontinuing the recording operation.

Incidentally, the synchronization control circuit 40 may implement a synchronization control process combined with the synchronization control process shown in FIGS. 4 and 5 and the synchronization control process shown in FIGS. 6 and 7.

Figure 8:
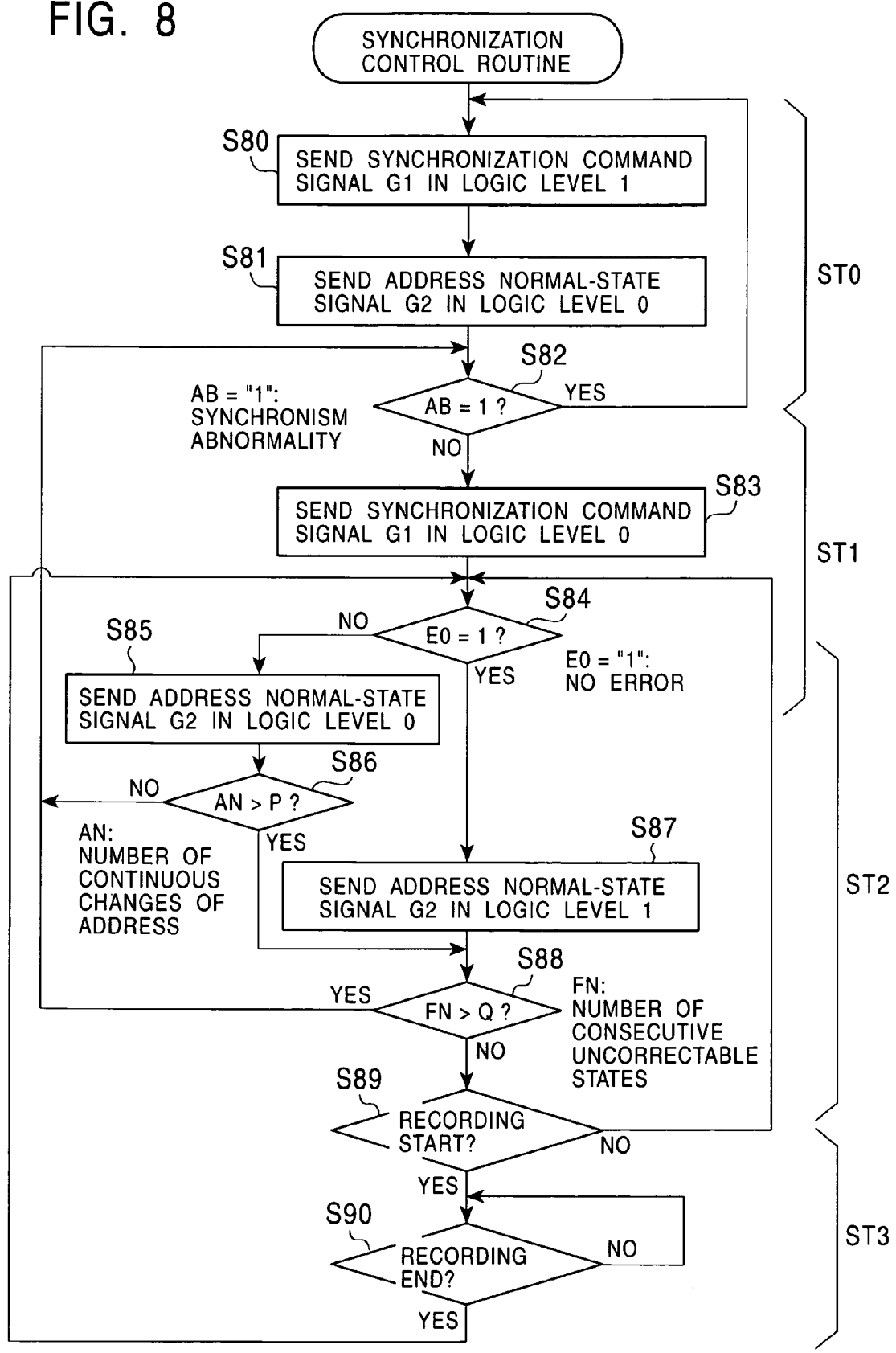
FIG. 8 is a diagram showing another example of a synchronization control routine to be executed in the synchronization control circuit 40.

FIG. 8 is a diagram showing a synchronization control routine made in view of that point.

Incidentally, the steps S80-S88 in the synchronization control routine shown in FIG. 8 are similar to the steps S40-S48 shown in FIG. 4. It is noted that, in the synchronization control routine shown in FIG. 8, in the case that the continuous uncorrectable number of times in the address data AD is determined smaller than a predetermined number of times or correctable in step S88, then the synchronization control circuit 40 determines whether or not a record starting signal has been supplied (step S89). When it is determined in the step S89 that a record starting signal has not been supplied, the synchronization control circuit 40 returns to step S84 and determines whether a normal address is acquired or not. Meanwhile, when it is determined in the step S89 that a record starting signal has been supplied, then the synchronization control circuit 40 repetitively determines whether or not a record ending signal is supplied or not until such a record ending signal is supplied (step S90). In the step S90, when a record ending signal is determined supplied, the synchronization control circuit 40 returns to executing the step S84.

Figure 9:
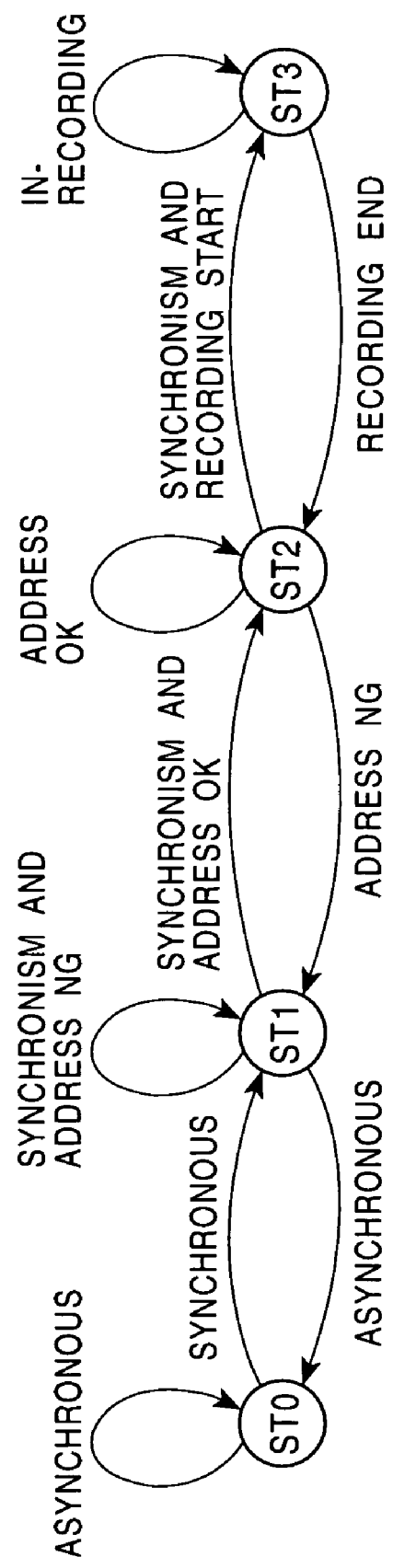
FIG. 9 is a state transition diagram showing the state of the address counter 41 and the state of the timing-signal generation circuit 50 when the synchronization control circuit 40 carries out a synchronization control process according to a synchronization control routine shown in FIG. 8.

FIG. 9 is a diagram showing a transition of a setting state to the address counter 41 and timing-signal generation circuit 50 when the synchronization control circuit 40 carries out a synchronization control process according to a procedure shown in FIG. 8.

Incidentally, in FIG. 9, the transition in the asynchronous state ST0, synchronization state ST1 or address normal state ST2 is similar to that shown in FIG. 5. In FIG. 9, when a record start signal is determined supplied in the address normal state ST2 (step S89), the process shifts to a recording state ST3. In the recording state ST3, the recording state ST3 is maintained until a record ending signal is determined supplied (step S90). Herein, if a record ending signal is determined supplied, the process shifts to an address normal state ST2. Namely, during a recording to the recording disk 30, the recording state ST3 is maintained even if the corrected address data read from the recording disk 30 is not correct so that the process shifts to an address normal state ST2 after the recording operation is over.

Accordingly, because a re-synchronism process is placed stand-by during the period of time the corrected address data ADR is being determined a correct address or during a recording operation, information data recording can be swiftly completed without discontinuing recording.

Figure 10:
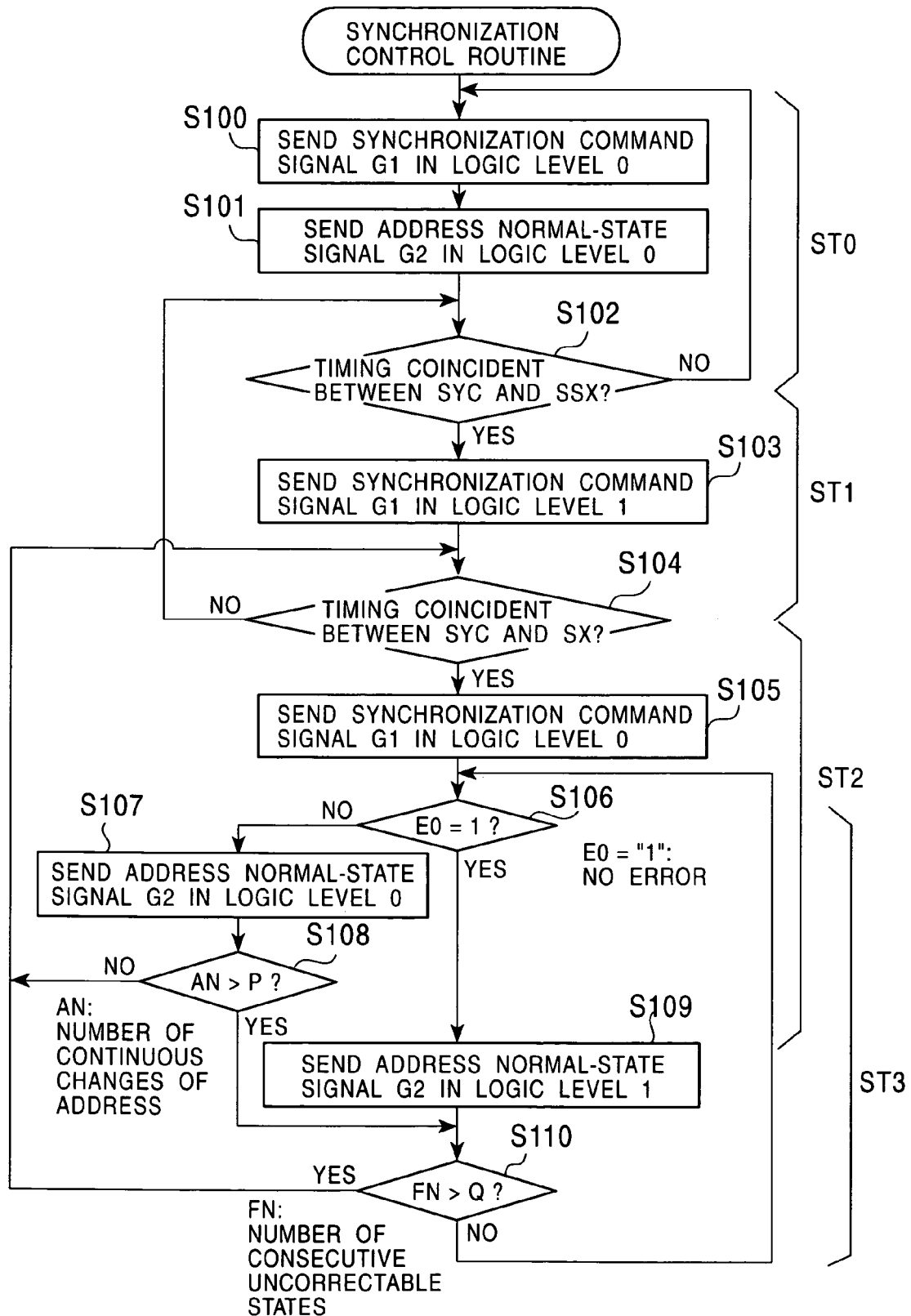
FIG. 10 is a diagram showing another example of a synchronization control routine to be executed in the synchronization control circuit 40.

FIG. 10 is a diagram showing another example of synchronization control routine to be carried out by the synchronization control circuit 40.

In FIG. 10, at first, the synchronization control circuit 40 supplies a synchronism command signal G1 in logic level 0 to the timing signal control circuit 50 (step S100). By executing the step S100, the counter 503 of the timing-signal generation circuit 50 operates by itself. After executing the step S100, the synchronization control circuit 40 supplies the address counter 41 with an address normal-state signal G2 in logic level 0 representative of not having acquired a normal address (step S101). By executing the step S101, the counter 41 of the timing-signal generation circuit 50 operates by itself. Next, the synchronization control circuit 40 determines whether or not the temporary synchronization read timing signal SSX, generated based on a count value of the counter 501 of the timing-signal generation circuit 50, is in the same timing as the synchronization detection signal SYC (step S102). If it is determined in step S102 that the both are not in the same timing, the synchronization control circuit 40 returns to the step S100 and repetitively carries out the foregoing operation. Meanwhile, if it is determined in the step S102 that the both are in the same timing, the synchronization control circuit 40 supplies a synchronism command signal G1 in logic level 0 to the timing signal control circuit 50 (step S103). By executing the step S103, the counter 503 of the timing-signal generation circuit 50 takes in a predetermined counter initial value each time a synchronization detection signal SYC in logic level 1 is supplied, thus making a count-up operation. Due to this, from the decoder 505 is outputted a data fixing signal FX, address demodulated timing signal AX and synchronization demodulation timing signal SX in timing synchronization with the synchronization detection signal SYC. Next, the synchronization control circuit 40 determines whether or not the synchronism demodulated timing signal SX, generated based on a count value of the counter 503 of the timing-signal generation circuit 50, is in the same timing as the synchronization detection signal SYC (step S104). If it is determined in step S104 that the both are not in the same timing, the synchronization control circuit 40 returns to the step S102 and repetitively carries out the foregoing operation. Meanwhile, if it is determined in the step S104 that the synchronism modulation timing signal SX and the synchronization detection signal SYC are in the same timing, the synchronization control circuit 40 supplies a synchronism command signal G1 in logic level 1 to the timing signal control circuit 50 (step S105). By executing the step S105, the counter 503 of the timing-signal generation circuit 50 operates by itself. Next, the synchronization control circuit 40 determines whether or not an error zero signal E0 is in logic level 1 representative of an error-free state (step S106). In the step S106, if it is determined that the error zero signal E0 is not in logic level 2, i.e. if an error exist in the address data AD, the synchronization control circuit 40 supplies the address counter 41 with an address normal-state signal G2 in logic level 0 representative of not having acquired a normal address (step S107). By executing the step S107, the counter 41 of the timing-signal generation circuit 50 operates by itself. Then, the synchronization control circuit 40 determines whether or not a continuous change address number signal AN represents a number of continuous changes of address greater than a predetermined number P (step S108). If it is determined in the step S108 that the number represented by continuous change address number signal AN is not greater than the predetermined number P, the synchronization control circuit 40 returns to the step S104 and repetitively carries out the foregoing operation.

Meanwhile, if the error zero signal E0 is determined in logic level 1 in the step S106, the synchronization control circuit 40 supplies the address counter 41 with an address normal-state signal G2 in logic level 1 representative of having acquired a normal address (step S109). By executing the step S109, the address counter 41 takes in as a counter initial value a value the corrected address data ADR is added by 1 each time a data fixing signal FX in logic level 1 is supplied from the timing-signal generation circuit 50, thus making a count-up operation continuing from that value. Namely, the address counter 41 creates generated address data ADC on the basis of the normal corrected address data ADR reproduced from the recording disk 30. Meanwhile, if the address continuous changes signal AN is determined greater than a predetermined umber P in the step S108, then the error zero signal E0 is in logic level 0 and the address continuous changes signal AN is greater than the predetermined number P. Accordingly, the address counter 41 makes a count-up operation. Then, the synchronization control circuit 40 determines whether or not the consecutive uncorrectable states signal FN represents a number greater than the predetermined number of times Q (step S110). In the step S110, if the consecutive uncorrectable states signal FN is determined not greater than the predetermined number of times Q, the synchronization control circuit 40 returns to executing the step S106 and determines whether or not a normal address have been acquired. In this duration, if the consecutive uncorrectable states signal FN is determined greater than the predetermined number of times Q in the step S110, the synchronization control circuit 40 returns to executing the step S104 and repetitively executes the foregoing operation.

Figure 11:
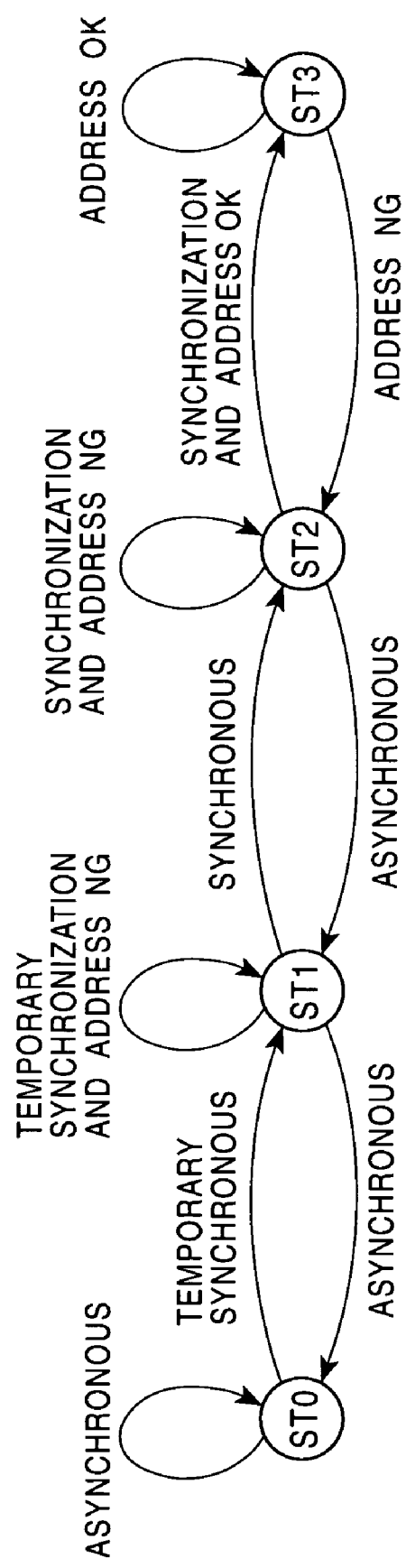
FIG. 11 is a state transition diagram showing the state of the address counter 41 and the state of the timing-signal generation circuit 50 when the synchronization control circuit 40 carries out a synchronization control process according to a synchronization control routine shown in FIG. 10.

FIG. 11 is a diagram showing a transition in the setting state to the address counter 41 and timing-signal generation circuit 50 when the synchronization control circuit 40 carries out a synchronization control process according to a synchronization control routine shown in FIG. 10.

At first, while the synchronization detection signal SYC detected from the recording disk 30 and the temporary synchronization read timing signal SSX generated based on a count value of the counter 501 of the timing-signal generation circuit 50 are determined not in the same timing (step S102), the asynchronous state ST0 is maintained to send a synchronism command signal G1 in logic level 0 and an address normal-state signal G2 in logic level 0. In the asynchronous state ST0, the counter 503 within the timing-signal generation circuit 50 operates by itself. In timing asynchronous with the synchronization signal, generated is a data fixing signal FX, address demodulated timing signal AX and synchronism demodulated timing signal SX.

Meanwhile, if the synchronization detection signal SYC and the temporary synchronization read timing signal SSX are determined in the same timing, the process shifts to a temporary synchronization state ST1. In the temporary synchronization state ST1, a synchronism command signal G1 in logic level 1 is sent to load the counter 503 with a current count value of the temporary synchronism counter 501. Then, determination is made as to whether or not the synchronization detection signal SYC detected from the recording disk 30 and the synchronism demodulated timing signal SX generated based on a count value of the counter 503 of the timing-signal generation circuit 50 are in the same timing (step S104). In this process, if it is determined that the both are in the same timing, the process shifts to a synchronization state ST2.

In the synchronization state ST2, a synchronism command signal G1 in logic level 0 is sent and the counter 503 operates by itself. Due to this, the timing-signal generation circuit 50 begins to generate a data fixing signal FX, address demodulated timing signal AX and synchronism demodulated timing signal SX synchronization in phase with the synchronization detection signal SYC. In this duration, in the case of a determination that the corrected address data ADR reproduced from the recording disk 30 has not changed consecutively a number of times greater than a predetermined number P (step S108), the process is maintained in the synchronization state ST2. Incidentally, in this duration, in the case of a determination that the synchronization detection signal SYC and the synchronism demodulated timing signal SX are not in the same timing, the process shifts up to a temporary synchronization state ST1. Meanwhile, when not in temporary synchronism either, the process shifts to an asynchronous state ST0. Meanwhile, in the case of a determination that no error exists in the corrected address data, i.e. in the case the corrected address data ADR is determined a correct address, the process shifts to an address normal state ST3. In the address normal state ST3, a normal state signal G2 in logic level 1 is supplied to the address counter 41 (step S109). Due to this, the address counter 41 takes in the corrected address data ADR and increases (or decreases) the address data value thereof by 1 at one time, thereby creating generated address data ADC and supplying it to the recording/reproducing control circuit 42. In the case that there is determined an error in the corrected address data ADR (E0="1") and the corrected address data ADR is determined changed continuously a number of times greater than a predetermined number P, a normal-state signal G2 in logic level 0 has been supplied to increase (or decrease) the value of the before-obtained address data by 1 at one time. In this duration, the address normal state ST3 is maintained until the address data AD read from the recording disk 30 is determined not correctable continuously a number of times greater than a predetermined number of times Q (step S110), i.e. until the corrected address data ADR is determined an incorrect address. On the other hand, in the case that the address data AD read from the recording disk 30 is determined not correctable continuously a number of times greater than the predetermined number of times Q, the process shifts to a synchronism state ST2. Namely, in the case that the address data read from the recording disk 30 and correction-processed is determined an incorrect address, the process shifts to an address normal state ST3, synchronization state ST2, temporary synchronization state ST1 and asynchronous state ST0 and then enters a re-synchronism process routine (loading an initial value onto the counter 503 in timing synchronization with the synchronization detection signal SYC), making a determination of going out of synchronism under influence of a certain external disturbance. In other words, once the process shifts to an address normal state ST3, re-synchronism process is placed stand-by for execution until it is determined that the corrected address data ADR is an incorrect address and synchronism is placed out.

Accordingly, in also the synchronization control process as shown in FIGS. 10 and 11, even if a temporary external disturbance occurs, information data recording can be swiftly completed without discontinuing the recording operation.

Figure 12:
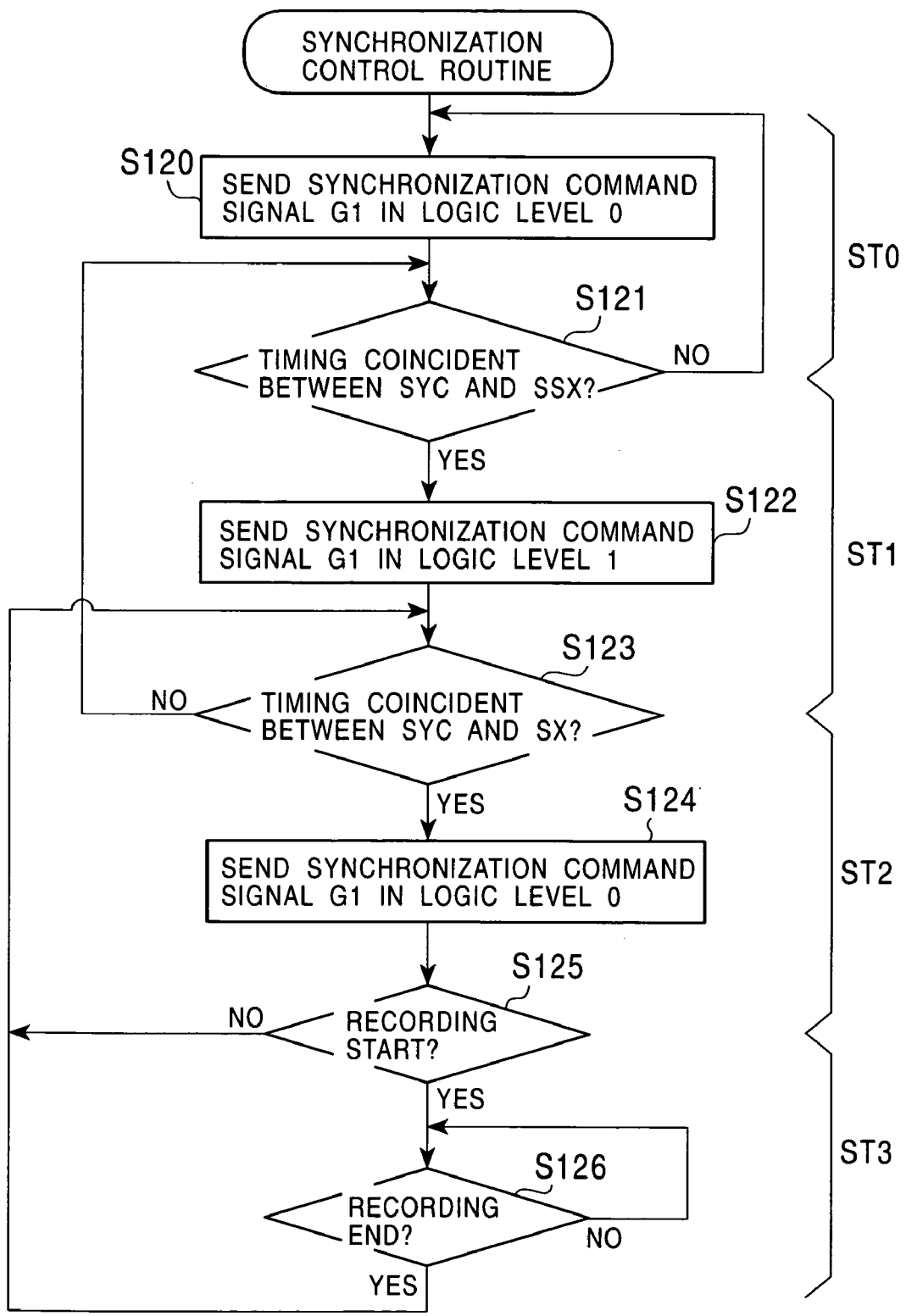
FIG. 12 is a diagram showing another example of a synchronization control routine to be executed in the synchronization control circuit 40.

Meanwhile, FIG. 12 is a diagram showing another example of synchronization control routine to be executed by the synchronization control circuit 40.

In FIG. 12, at first, the synchronization control circuit 40 supplies a synchronization command signal G1 in logic level 0 to the timing-signal generation circuit 50 (step S120). By executing the step S120, the counter 503 of the timing-signal generation circuit 50 operates by itself. After executing the step S120, the synchronization control circuit 40 determines whether or not the temporary synchronization read timing signal SSX generated based on a count value of the counter 501 of the timing-signal generation circuit 50 is in the same timing as the synchronization detection signal SYC (step S121). In the case of a determination in the step S121 that the both are not in the same timing, the synchronization control circuit 40 returns to the step S120 and repetitively carries out the foregoing operation. Meanwhile, if it is determined in the step S121 that the both are in the same timing, the synchronization control circuit 40 supplies a synchronism command signal G1 in logic level 1 to the timing-signal generation circuit 50 (step S122). By executing the step S122, the counter 503 of the timing-signal generation circuit 50 takes in a predetermined counter initial value each time a synchronization detection signal SYC in logic level 1 is supplied, thus making a count-up operation. Due to this, from the decoder 505 is outputted a data fixing signal FX, address demodulated timing signal AX and synchronization demodulation timing signal SX, as noted before, in timing synchronization with the synchronization detection signal SYC. After executing the step S122, the synchronization control circuit 40 determines whether or not the synchronism demodulated timing signal SX generated based on a count value of the counter 503 of the timing-signal generation circuit 50 and the synchronization detection signal SYC are in the same timing (step S123). If it is determined in the step S123 that the both are not in the same timing, the synchronization control circuit 40 returns to the step S121 and repetitively carries out the foregoing operation. Meanwhile, if it is determined in the step S123 that the synchronism demodulated timing signal SX and the synchronization detection signal SYC are in the same timing, the synchronization control circuit 40 supplies a synchronization command signal G1 in logic level 0 to the timing-signal generation circuit 50 (step S124). By executing the step S124, the counter 503 of the timing-signal generation circuit 50 operates by itself. After executing the step S124, the synchronization control circuit 42 determines whether or not from the recording/reproducing control circuit 40 determines whether or not have been supplied a record starting signal notifying to start a recording of information data to the recording disk 30 (step S125). In the case of a determination in the step S125 that a record starting signal has not been supplied, the synchronization control circuit 40 returns to executing the step S123 and repetitively carries out the foregoing operation. Meanwhile, in the case of a determination in the step S125 that a record starting signal has been supplied, the synchronization control circuit 40 then repetitively determines whether or not from the recording/reproducing control circuit 42 has been supplied a record ending signal notifying to end the recording of information data to the recording disk 30, until a record ending signal is supplied (step S126). In the case of a determination in the step S126 that a record ending signal has been supplied, the synchronization control circuit 40 returns to executing the step S123 and repetitively carries out the foregoing operation.

Figure 13:
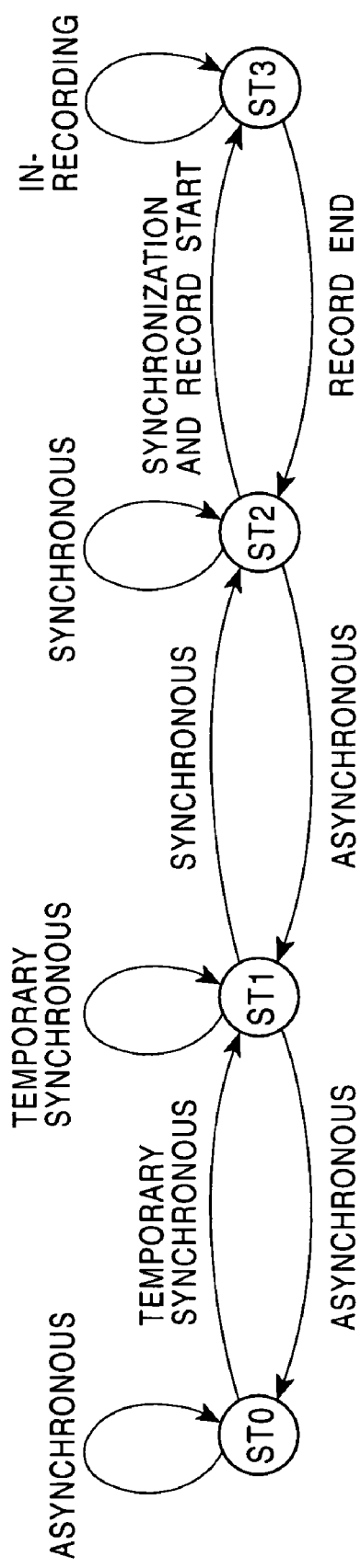
FIG. 13 is a state transition diagram showing the state of the timing-signal generation circuit 50 when the synchronization control circuit 40 carries out a synchronization control process according to a synchronization control routine shown in FIG. 12.

FIG. 13 is a diagram showing a transition in the setting state to the timing-signal generation circuit 50 when the synchronization control circuit 40 carries out a synchronization control process according to a synchronization control routine shown in FIG. 12.

At first, while the synchronization detection signal SYC detected from the recording disk 30 and the temporary synchronization read timing signal SSX generated based on a count value of the counter 501 of the timing-signal generation circuit 50 are determined not in the same timing (step S121), the asynchronous state ST0 is maintained to send a synchronism command signal G1 in logic level 0. In the asynchronous state ST0, the counter 503 within the timing-signal generation circuit 50 operates by itself. In timing asynchronous with the synchronization signal, generated is a data fixing signal FX, address demodulated timing signal AX and synchronism demodulated timing signal SX.

Meanwhile, if it is determined that the synchronization detection signal SYC and the temporary synchronization read timing signal SSX are in the same timing, the process shifts to a temporary synchronization state ST1. In the temporary synchronization state ST1, a synchronism command signal G1 in logic level 1 is sent to load the counter 503 with a current count value of the temporary synchronism counter 501. Then, determination is made as to whether or not the synchronization detection signal SYC detected from the recording disk 30 and the synchronism demodulated timing signal SX generated based on a count value of the counter 503 of the timing-signal generation circuit 50 are in the same timing (step S123). In this process, if it is determined that the both are in the same timing, the process shifts to a synchronization state ST2.

In the synchronization state ST2, a synchronism command signal G1 in logic level 0 is sent and the counter 503 operates by itself. Due to this, the timing-signal generation circuit 50 begins to generate a data fixing signal FX, address demodulated timing signal AX and synchronism demodulated timing signal SX synchronization in phase with the synchronization detection signal SYC. In this duration, in the case of a determination that a record staring signal has been supplied (step S125), the process shifts to a recording state ST3. In the recording state ST3, this recording state ST3 is maintained until a record ending signal is determined supplied (step S126). In this process, if it is determined tha a record ending signal has been supplied, the process shifts to a synchronization state ST2 and carries out a synchronizing process. In the case of a determination of going out of synchronism, the process shifts to a temporary synchronization state ST1. Furthermore, in the case of a determination of also going out of temporary synchronism, the process shifts to an asynchronous state ST0 and carries out a re-synchronizing process. Accordingly, during recording to the recording disk 30, even if disturbance temporarily occurs due to external disturbance such as crosstalk from the adjacent track, damage on the recording disk surface or the like, the process is placed in a stand-by state for re-synchronism process.

Incidentally, the synchronization control circuit 40 may implement a synchronization control process combined with the synchronization control process shown in FIGS. 10 and 11 and the synchronization control process shown in FIGS. 12 and 13.

Figure 14:
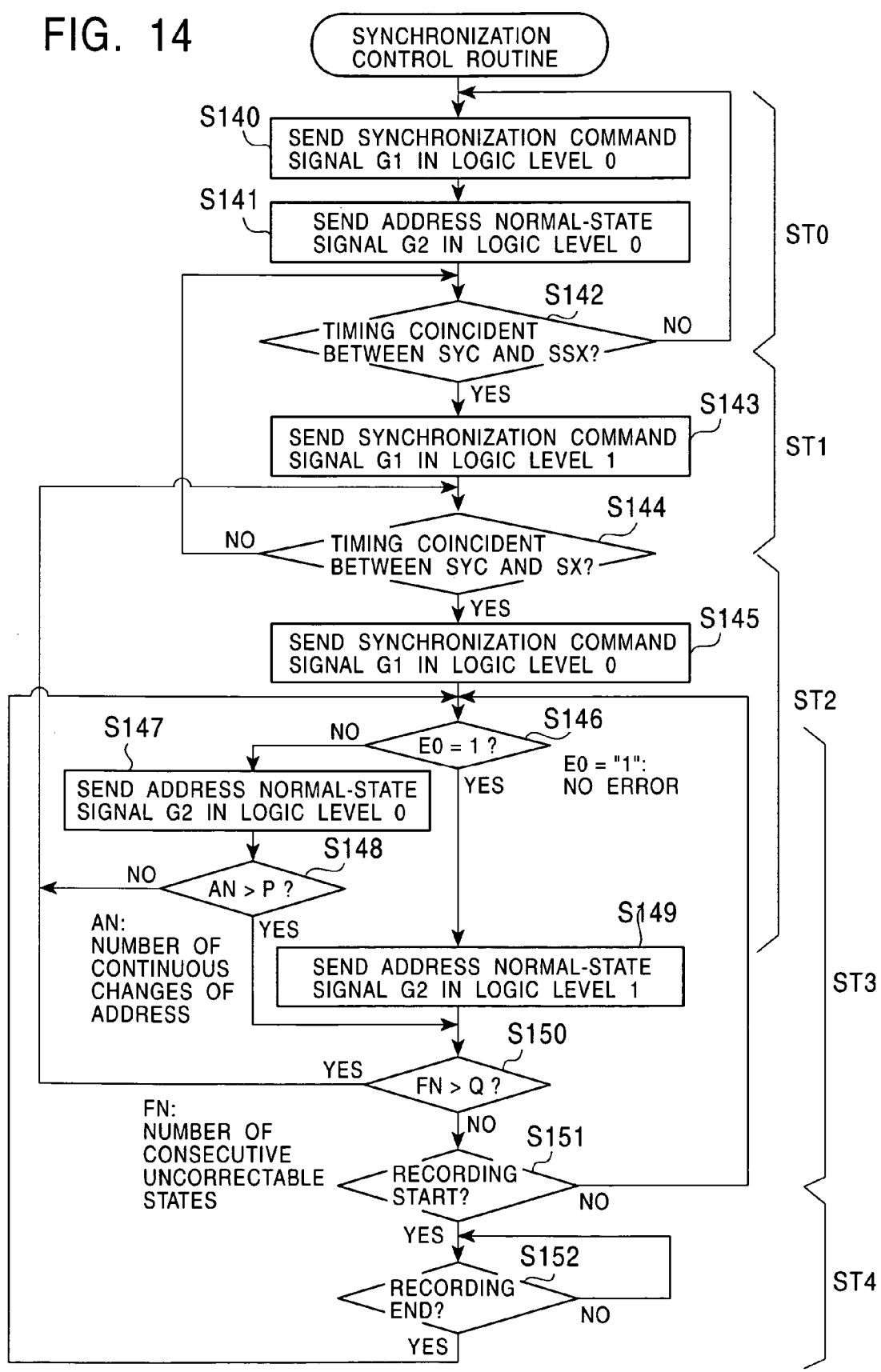
FIG. 14 is a diagram showing another example of a synchronization control routine to be executed in the synchronization control circuit 40.

FIG. 14 is a diagram showing a synchronization control routine made in view of that point.

Incidentally, the steps S140-S150 in the synchronization control routine shown in FIG. 14 are similar to the steps S100-S110 shown in FIG. 10. It is noted that, the synchronization control routine shown in FIG. 14, in the case that the continuous uncorrectable number of times in the address data AD is determined smaller than a predetermined number of times or correctable in step S150, then the synchronization control circuit 40 determines whether or not a record starting signal has been supplied (step S151). When it is determined in the step S151 that a record starting signal has not been supplied, the synchronization control circuit 40 returns to the step S146 and again determines whether or not a normal address has been acquired. Meanwhile, when it is determined in the step S151 that a record starting signal has been supplied, then the synchronization control circuit 40 repetitively determines whether or not a record ending signal is supplied until such a record ending signal has been supplied (step S152). In the step S152, when a record ending signal is determined supplied, the synchronization control circuit 40 returns to the step S146 and again determines whether or not a normal address has been acquired.

Figure 15:
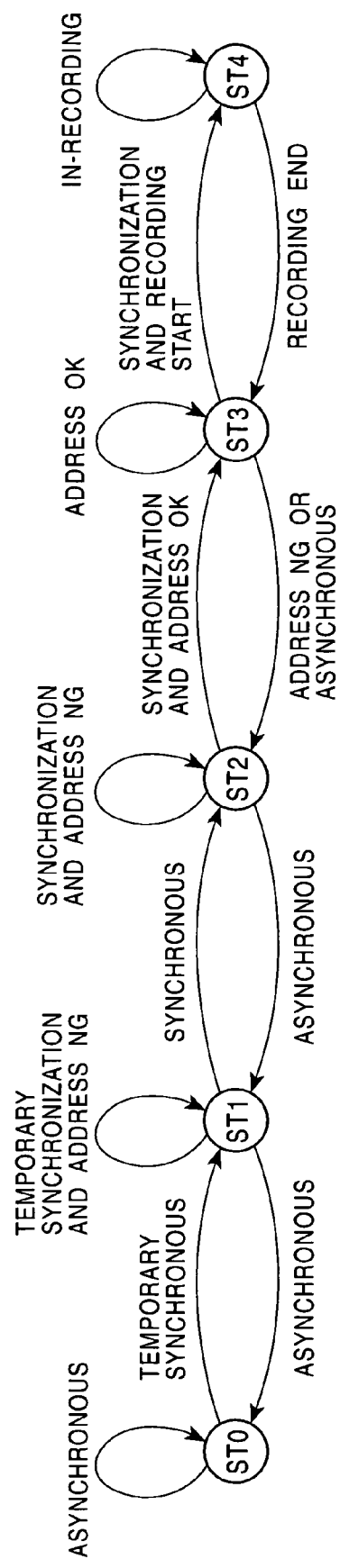
FIG. 15 is a state transition diagram showing the state of the address counter 41 and the state of the timing-signal generation circuit 50 when the synchronization control circuit 40 carries out a synchronization control process according to a synchronization control routine shown in FIG. 14.

FIG. 15 is a diagram showing a transition of a setting state to the address counter 41 and timing-signal generation circuit 50 when the synchronization control circuit 40 carries out a synchronization control process according to a procedure shown in FIG. 14.

At first, while the synchronization detection signal SYC detected from the recording disk 30 and the temporary synchronization read timing signal SSX generated based on a count value of the counter 501 of the timing-signal generation circuit 50 are determined not in the same timing (step S142), the asynchronous state ST0 is maintained to send a synchronism command signal G1 in logic level 0. In the asynchronous state ST0, the counter 503 within the timing-signal generation circuit 50 operates by itself. In timing asynchronous with the synchronization signal, generated is a data fixing signal FX, address demodulated timing signal AX and synchronism demodulated timing signal SX.

Meanwhile, if the synchronization detection signal SYC and the temporary synchronization read timing signal SSX are determined in the same timing, the process shifts to a temporary synchronization state ST1. In the temporary synchronization state ST1, a synchronism command signal G1 in logic level 1 is sent to load the counter 503 with a current count value of the temporary synchronism counter 501. Then, determination is made as to whether or not the synchronization detection signal SYC detected from the recording disk 30 and the synchronism demodulated timing signal SX generated based on a count value of the counter 503 of the timing-signal generation circuit 50 are in the same timing (step S144). In this process, if the both are determined as in the same timing, the process shifts to a synchronization state ST2.

In the synchronization state ST2, a synchronism command signal G1 in logic level 0 is sent and the counter 503 operates by itself. Due to this, the timing-signal generation circuit 50 begins to generate a data fixing signal FX, address demodulated timing signal AX and synchronism demodulated timing signal SX synchronization in phase with the synchronization detection signal SYC. In this duration, in the case of a determination that the corrected address data ADR reproduced from the recording disk 30 has not changed consecutively a number of times greater than a predetermined number P (step S148) and a determination that the synchronization detection signal SYC and the synchronism demodulated timing signal SX are in the same timing (step S144), the process is maintained in the synchronization state ST2. Incidentally, in the case of a determination that the synchronization detection signal SYC and the synchronism demodulated timing signal SX are not in the same timing, the process shifts up to a temporary synchronization state ST1. Meanwhile, when not in temporary synchronism either, the process shifts to an asynchronous state ST0. On the oher hand, in the case of a determination that there is no error in the corrected address data ADR (step S146), the process shifts to an address normal state ST3. In the address normal state ST3, an address normal-state signal G2 in logic level 1 is supplied to the address counter 41 (step S149). Due to this, the address counter 41 takes in the corrected address data ADR and increases (or decreases) the address data value thereof by 1 at one time, thereby creating generated address data ADC and supplying it to the recording/reproducing control circuit 42. In the case that the corrected address data ADR is determined having an error (E0="1") and the corrected address data ADR is determined having continuously changed a number of times greater than a predetermined number P, an address normal-state signal G2 in logic level 0 is supplied to increase (or decrease) the value of address data acquired before by 1 at one time. Incidentally, the address normal state ST3 is maintained until the address data AD is determined uncorrectable consecutively a number of times greater than a predetermined number of times Q (step S150), i.e. until the corrected address data ADR read from the recording disk 30 and then error-corrected is determined as an incorrect address. Herein, in the case that the address data AD read from the recording disk 30 is determined uncorrectable consecutively a number of times greater than the predetermined number of times Q, the process shifts to a synchronization state ST2. Namely, in the case that the corrected address data is determined as an incorrect address, determination is as going out of synchronism under influence of a certain external disturbance, and the process returns to the synchronization state ST2 and carries out a re-synchronism process. In other words, once the the process shifts to an address normal state ST3, even if the synchronization signal read from the recording disk 30 be temporarily disturbed, re-synchronism process is not carried out until the corrected address data ADR is determined an incorrect address.

Meanwhile, in the case of a determination that the address data AD is not uncorrectable consecutively a number of times greater than the predetermined number of times Q and a determination that a record starting signal notifying to start a recording to the recording disk 30 has been supplied (step S151), the process shifts to a recording state ST4. In the recording state ST4, this determining operation is repetitively executed until it is determined that a record ending signal has been supplied (step S152). In this process, if a record ending signal is determined supplied, the process shifts to an address normal state ST3. Namely, during recording to the recording disk 30, the recording state ST4 is maintained. In this duration, after ending the recording, the process shifts to an address normal state ST3.

Therefore, according to the synchronization control process shown in FIGS. 13 and 14, even if there is a temporary disturbance in a synchronization signal read from the recording disk 30, re-synchronism process is not carried out in the case the corrected address data after error correction is of a proper address or during recording.

As described above, in the synchronization control circuit 40, in the case that the corrected address data read from the recording disk 30 and then error-corrected is determined as a proper address, a re-synchronism process is placed stand-by for execution until the corrected address data is determined as an incorrect address. Meanwhile, the synchronization control circuit 40 similarly puts a re-synchronism process into stand-by for execution during recording to the recording disk 30.

Therefore, according to the operation, even if a temporary external disturbance be caused by the crosstalk from the adjacent tracks or the dusts, dirt, mars or the like on the recording disk surface, information data recording can be swiftly completed without discontinuing recording operation.

Incidentally, in the above embodiment, a synchronism process is implemented when determining the corrected address data as an incorrect address or upon ending a recording operation. However, re-synchronism process may be forcibly effected depending upon so-called a search operation that is to forcibly transfer the recording/reproducing head 32 to a predetermined recording position.

This application is based on Japanese Patent Application No. 2002-325832 which is herein incorporated by reference.

What is claimed is:

1. An information recording/reproducing apparatus for recording or reproducing information data to or from a recording medium recorded with a synchronization signal and an address indicating a recording position which are preliminarily modulated, the information recording/reproducing apparatus comprising:

a reading unit for reading recorded information from the recording medium and obtaining a readout signal;

a timing pulse generator for generating a demodulated timing pulse in variable generation timing;

a demodulator for demodulating the synchronization signal and the address data representative of an address, from the readout signal according to the demodulated timing pulse;

an error corrector for carrying out an error correction process on the address data and obtaining corrected address data;

an address judging section for determining whether or not the corrected address data is a correct address; and a synchronization controller for causing the timing pulse generator to execute a synchronization process for placing the generation timing in synchronism with the synchronization signal when the synchronization signal has a period equal to a predetermined period;

whereby the synchronization controller, in the case the corrected address data is determined as a correct address, then puts the synchronization process into stand-by for execution until the corrected address data is determined as an incorrect address.

2. An information recording/reproducing apparatus according to claim 1, wherein the synchronization controller puts the synchronization process into stand-by for execution even during recording operation to the recording medium.

3. An information recording/reproducing apparatus according to claim 1, wherein the timing pulse generator comprises a counter for taking in a predetermined initial value in timing of the synchronization signal according to an executing command for the synchronization process supplied from the synchronization controller and making a counting from the initial value, and a part for generating a pulse signal when a count value of the counter agrees with a predetermined value and outputting it as the demodulated timing pulse.

4. An information recording/reproducing apparatus according to claim 3, wherein the synchronization controller puts the synchronization process into stand-by for execution even during recording operation to the recording medium.

5. An information recording/reproducing apparatus according to claim 1, wherein the address judging section determines the corrected address data as a correct address when the corrected address data increases or decreases consecutively by 1 at one time, and determines the corrected address data as an incorrect address when the address data is consecutively uncorrectable on error.

6. An information reproducing apparatus for reproducing information data from a recording medium recorded with a synchronization signal and an address indicating a recording position which are preliminarily modulated, the information reproducing apparatus comprising:

a reading unit for reading recorded information from the recording medium and obtaining a readout signal;

a timing pulse generator for generating a demodulated timing pulse in variable generation timing;

a demodulator for demodulating the synchronization signal and the address from the readout signal according to the demodulated timing pulse;

an error corrector for carrying out an error correction process on the address data and obtaining corrected address data;

an address judging section for determining whether or not the corrected address data is a correct address; and a synchronization controller for causing the timing pulse generator to execute a synchronization process for placing the generation timing in synchronism with the synchronization signal when the synchronization signal has a period equal to a predetermined period;

whereby the synchronization controller, in the case the corrected address data is determined as a correct address, then puts the synchronization process into stand-by for execution until the corrected address data is determined as an incorrect address.

7. An information reproducing method for reproducing, from a recording medium recorded with a synchronization signal and an address indicating a recording position which are preliminarily modulated, the synchronization signal and address from the recording medium when recording or reproducing information data to or from the recording medium, the information reproducing method comprising:

a reading step for reading recorded information from the recording medium and obtaining a readout signal;

a timing pulse generating step for generating a demodulated timing pulse in variable generation timing;

a demodulating step for demodulating the synchronization signal and the address data representative of the address, from the readout signal according to the demodulated timing pulse;

an error correcting step for carrying out an error correction process on the address data and obtaining corrected address data;

an address determining step for determining whether or not the corrected address data is a correct address; and a synchronization control step for executing a synchronization process for placing the generation timing in synchronism with the synchronization signal when the synchronization signal has a period equal to a predetermined period;

whereby the synchronization control step, in the case the corrected address data is determined as a correct address, then puts the synchronization process into stand-by for execution until the corrected address data is determined as an incorrect address.

8. An information reproducing method according to claim 7, wherein the synchronization control step puts the synchronization process into stand-by for execution even during recording operation to the recording medium.

9. An information reproducing apparatus according to claim 7, wherein the timing pulse generating step comprises a counting step for taking in a predetermined initial value in timing of the synchronization signal according to an executing command for the synchronization process and making a counting from the initial value, and a step for generating a pulse signal when a count value of the counter agrees with a predetermined value and outputting it as the demodulated timing pulse.

10. An information reproducing method according to claim 9, wherein the synchronization control step puts the synchronization process into stand-by for execution even during recording operation to the recording medium.

11. An information reproducing method according to claim 7, wherein the address determining step determines the corrected address data as a correct address when the corrected address data increases or decreases consecutively by 1 at one time, and determines the corrected address data as an incorrect address when the address data is consecutively uncorrectable for error.

* * * * *